United States Patent [19]  [11] 4,392,601
Fujikawa et al.  [45] Jul. 12, 1983

[54] TWO-SHIFT AUTOMATIC ASSEMBLING APPARATUS

[75] Inventors: Tsuneo Fujikawa, Ebina; Haruyoshi Takagishi, Yamato, both of Japan

[73] Assignee: Nissan Motor Company, Limited, Yokohama, Japan

[21] Appl. No.: 186,543

[22] Filed: Sep. 12, 1980

[30] Foreign Application Priority Data

Sep. 25, 1979 [JP] Japan .................................. 54-122831
Oct. 24, 1979 [JP] Japan .................................. 54-136438

[51] Int. Cl.³ ............................................. B23K 37/04
[52] U.S. Cl. ....................................... 228/4.1; 29/430; 339/5 M; 339/5 P
[58] Field of Search ................... 29/429, 430; 228/4.1, 228/45; 269/71, 905, 909, 910; 339/5 R, 5 M, 5 P, 8 R

[56] References Cited

U.S. PATENT DOCUMENTS 2,955,632 10/1960 Stone ............................... 269/905 X
3,243,177 3/1966 Christman et al. ............. 269/910 X
3,625,504 12/1971 Walker ............................. 269/905 X
3,643,935 2/1972 Bell ................................... 269/905 X
3,797,862 3/1974 Letterman ......................... 339/5 P
3,968,558 7/1976 Sekine et al. ..................... 29/429
4,294,500 10/1981 Wilson ............................... 339/5 P

FOREIGN PATENT DOCUMENTS

2810822 9/1978 Fed. Rep. of Germany.

Primary Examiner—Paul A. Bell

[57] ABSTRACT

A two-shift automatic assembling apparatus for selectively assembling a component member or members to an incomplete work of one model or a component member or members to an incomplete work of another model during each cycle of operation, comprising a base structure rotatable about a horizontal axis and having two opposite faces parallel with the axis. Two sets of assembling fixtures are mounted respectively on the two faces of the base structure so that one of the two sets of fixtures can be moved into operative position by turning the base structure into one of two diametrically opposed angular positions about the axis thereof.

8 Claims, 8 Drawing Figures

TWO-SHIFT AUTOMATIC ASSEMBLING APPARATUS

FIELD OF THE INVENTION

The present invention relates to a two-shift automatic assembling apparatus for selectively assembling at least one component member to an imcomplete work of one model or at least one component member to an incomplete work of another model during each cycle of operation of the assembling apparatus. More particularly, the present invention relates to a two-shift automatic assembling apparatus for selectively assembling component members of a body structure for a vehicle of one model to an incomplete assembly of the body structure or component members of a body structure for a vehicle of another model to an incomplete assembly of the body structure for the vehicle of the latter model during each cycle of operation of the assembling apparatus. The component members to be assembled to the incomplete assembly of the vehicle body structure may be the front and rear roof rails.

BACKGROUND OF THE INVENTION

A known automatic assembling apparatus which has been put to use in an assembly line for the body structures of automotive vehicles largely comprises a work tansfer mechanism for moving an incomplete assembly of a vehicle body structure into a position in which additional component members of the body structure are to be assembled to the incomplete assembly, and a set of assembling fixtures for moving the additional component members into positions suitable for being mounted on the incomplete assembly which is clamped in position. After the incomplete assembly of the vehicle body structure and the additional component members are thus held in predetermined positions with respect to each other, welding robots are put into operation to weld the additional component members to the incomplete assembly for thereby completing the vehicle body structure.

An automatic assembling apparatus of this nature is capable of assembling body structures of different types of vehicles such as vehicles of the sedan type and vehicles of the hardtop type, provided the two types of vehicles are of the same model. The assembling apparatus is, however, unable to handle body structures of different models and, for this reason, it has been required to set up two independent assembly lines for the assemblage of vehicle body structures of the two different models. This requires a disproportionately large amount of investment for the installation of the dual production lines and imposes a useless burden on automobile manufacturers especially when vehicles produced by the manufacturers are to be remodelled. If it is desired to re-use the assembly line for vehicles of the prior model, not a small number of fittings and fixtures in the assembly line must be discarded as useless, decreasing the feasibility of the existing assembly line. When, furthermore, the assembling fixtures are to be totally exchanged with new ones, large amount of time and labor are required for the disconnection and reconnection of the pipings and wirings during exchange of the fixtures.

The present invention is based on a discovery that works of two different models can be assembled in a single assembly line if two sets of fixtures are mounted respectively on the opposite sides of a rotatable base structure so as to permit selective use of the two sets of fixtures depending upon the models of the works to be completed. By adoption of such an arrangement, works of two different models can be assembled in a single line so that not only the cost for the production equipment can be reduced but the problems which have been concomitant with conventional assembling lines can be drastically solved.

When the rotatable base structure is to be turned to exchange the assembling fixtures to be put to use, the wirings leading from sources of power and control signals for the assembling apparatus must be disconnected from the fixtures to be put out of use and connected to the fixtures to be put to use. A rotary-type electric connector assembly is useful for permitting selective connection of the wirings to the two sets of fixtures. A conventional rotary-tye connector assembly comprising a combination of two fixed and rotatable contact blocks may be arranged in such a manner that the rotatable contact block is rotatable with the base structure of the assembling apparatus and the fixed contact block is fixed to, for example, the frame structure of the assembling apparatus. When the base structure is turned to exchange the assembling fixtures to be put to use, the rotatable contact block is also turned with respect to the fixed contact block so that the contact elements carried on the fixed contact block are disconnected from one set of contact elements on the rotatable contact block and are connected to another set of contact elements on the rotatable contact block.

The two contact blocks in an ordinary rotary-type connector assembly are held in face-to-face contact with each other so that the rotatable contact block is caused to slide on the fixed contact block when the former is turned with respect to the latter. In the arrangement of this nature, the contact elements on one of the contact blocks slide on the other contact block and the contact elements carried thereon so that the contact blocks and the contact elements carried thereon tend to wear early. Such a tendency is pronounced especially in a connector assembly utilized in an automatic assembling apparatus for vehicle body structures because as many as 100 contact elements are included in the connector assembly. A conventional rotary-type connector assembly is, for this reason, not fit for use for a prolonged period of time when used in an automatic assembling apparatus for vehicle body structure.

Another drawback of a prior-art rotary-type connector assembly is that the cables leading from the rotatable contact block are caused to twist when the contact block is turned with respect to the fixed contact block. This may cause breaks of the cables during use of the connector assembly. To avoid such a difficulty, it will be required to constitute the cables by strongly built cables such as those using music wires and/or to arrange the cables in loose conditions so as to be capable of taking up the rotation of the cables. These expedients not only give rise to an increase in the cost for the installation of the production equipment but can not perfectly eliminate the possibility that the cables may be broken by twisting action. If the cables happen to break during assembling operation, it is required to shut down the assembly line as a whole, causing reduction in the production efficiency.

SUMMARY OF THE INVENTION

In accordance with the present invention, there is provided a two-shift automatic assembling apparatus for selectively assembling at least one component member to an incomplete work of a first model or at least one component member to an incomplete work of a second during each cycle of operation of the apparatus, comprising a frame structure for accommodating at least a portion of one of said incomplete works therewithin, a base structure supported on said frame structure and having two parallel opposite faces, the base structure being rotatable between diametrically opposite two angular positions about an axis fixed with respect to the frame structure and substantially parallel with the two faces of the base structure, stop means for preventing the base structure from turning beyond the two angular positions when the base structure is turned into one of the two angular positions, and two sets of assembling fixtures detachably mounted on the two faces, respectively, of the base structure, each set of fixtures including work gauge means adapted to hold each of the incomplete works in a predetermined position with respect to the frame structure, carrier means adapted to carry each of the component members from the outside of the frame structure into a predetermined position within the frame structure, and parts gauge means adapted to transfer the component member from said predetermined position thereof into a predetermined ready-for-assembly position with respect to the work held in position by the work gauge means.

DESCRIPTION OF THE DRAWINGS

The present invention will be more clearly understood from the following description taken in conjunction with the accompanying drawings, in which.

DESCRIPTION OF THE PREFERRED EMBODIMENT

The preferred embodiment of the present invention will be hereinafter described with reference to the drawings.

Figure 1:
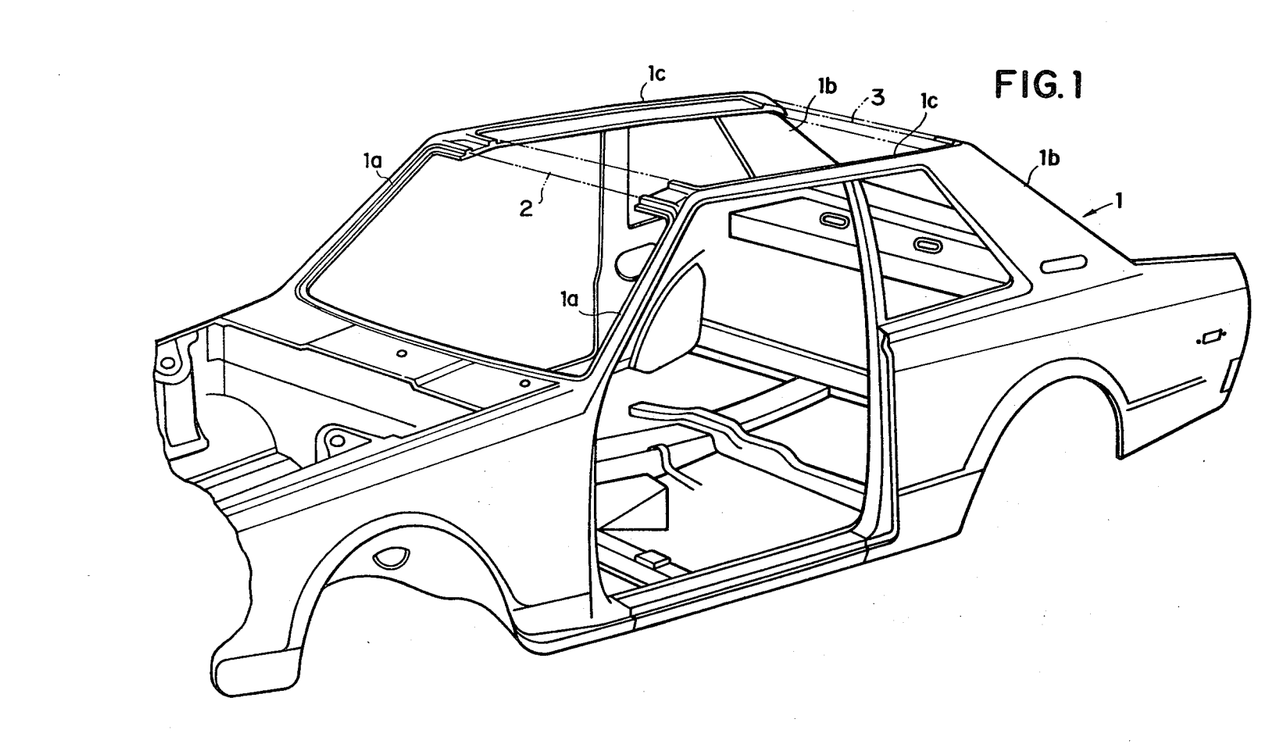
FIG. 1 is a perspective view of an imcomplete assembly of a vehicle body structure to be assembled by an apparatus embodying the present invention.

The embodiment of the present invention which will be described in the following is suitable as a two-shift automatic assembling apparatus for the assemblage of the body structure of an automative vehicle, particularly for completing an incomplete assembly 1 of a vehicle body with front and rear roof rail members 2 and 3 which are indicated by dots-and-dash lines in FIG. 1 of the drawings. This is, however, merely by way of example and, therefore, the two-shift automatic assembling apparatus according to the present invention may be designed and constructed in such a manner as to mount any other components and parts of a vehicle body structure on an incomplete assembly of the vehicle body structure or may be arranged to be suitable for completing incomplete works of any kinds of machines and equipment. Furthermore, the vehicle body structure shown in FIG. 1 is of the sedan type but the embodiment of the present invention to be described in the following is operable for the assemblage of the body structure of an automotive vehicle of the hardtop type, as will be understand as the description proceeds.

Figure 2:
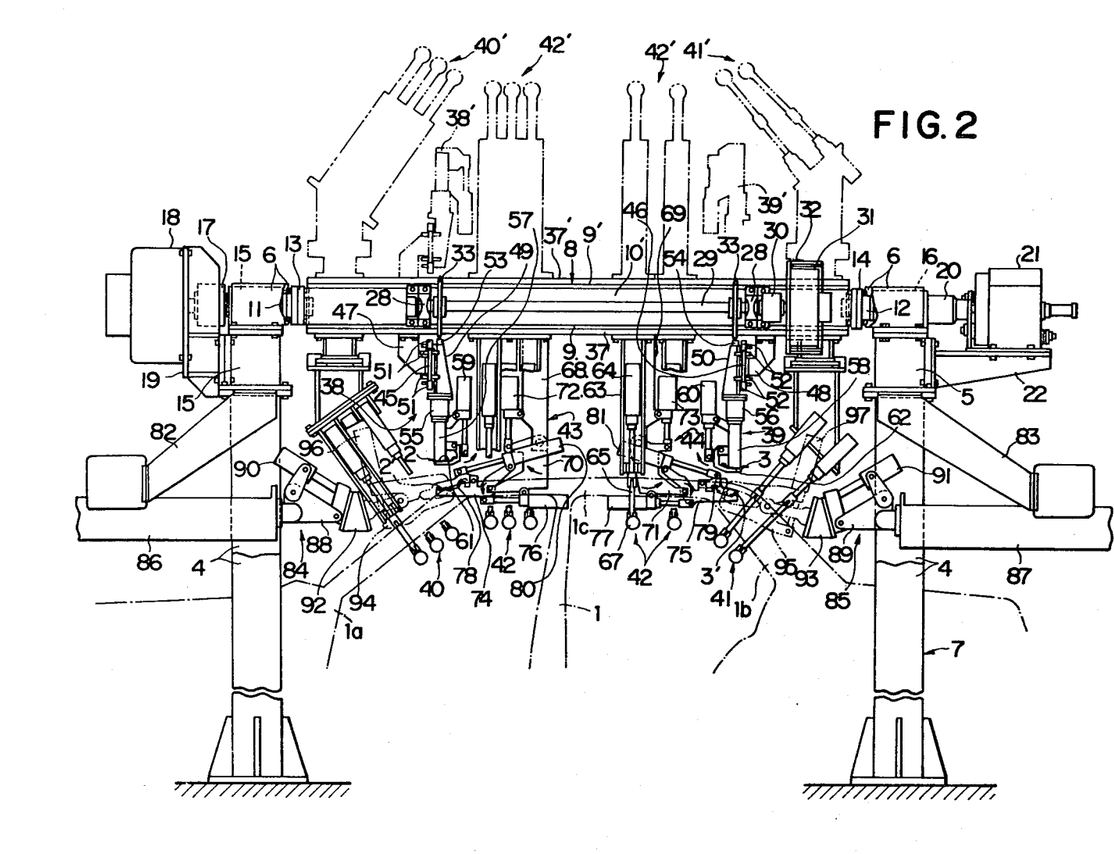
FIG. 2 is a side elevation of an embodiment of the apparatus according to the present invention.
Figure 3:
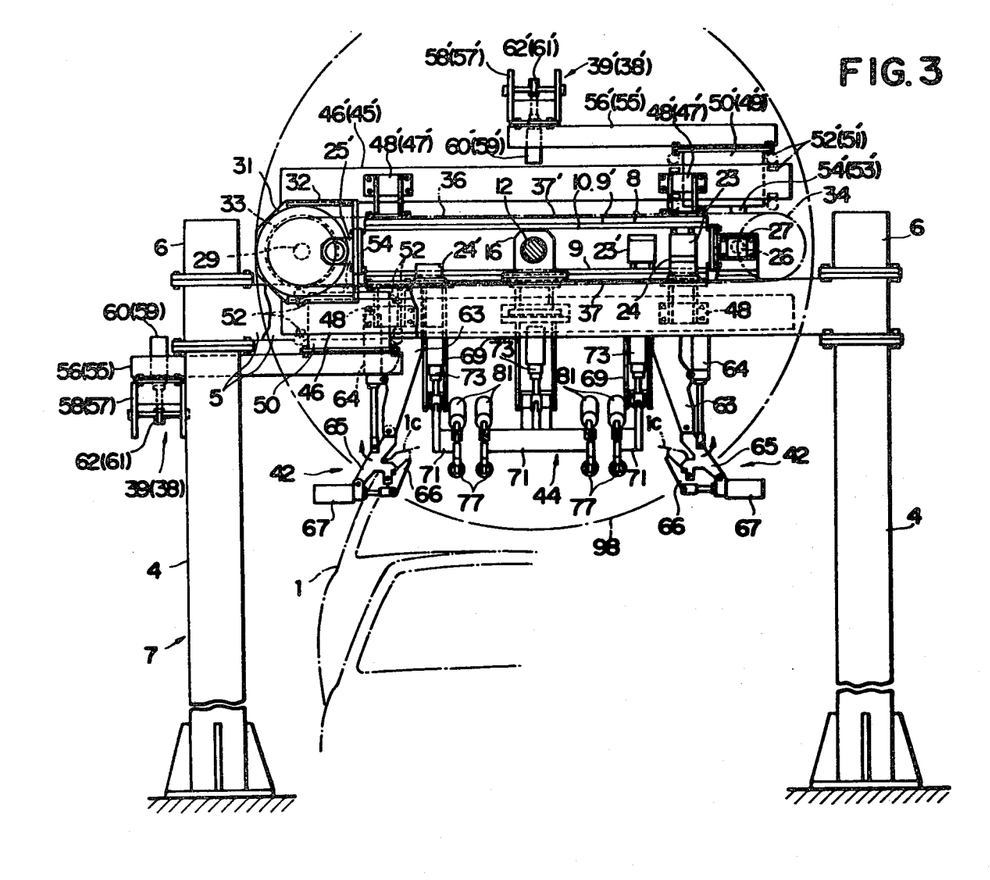
FIGS. 3 and 4 are a rear end view and a plan view, respectively, of the apparatus illustrated in FIG. 2.
Figure 4:
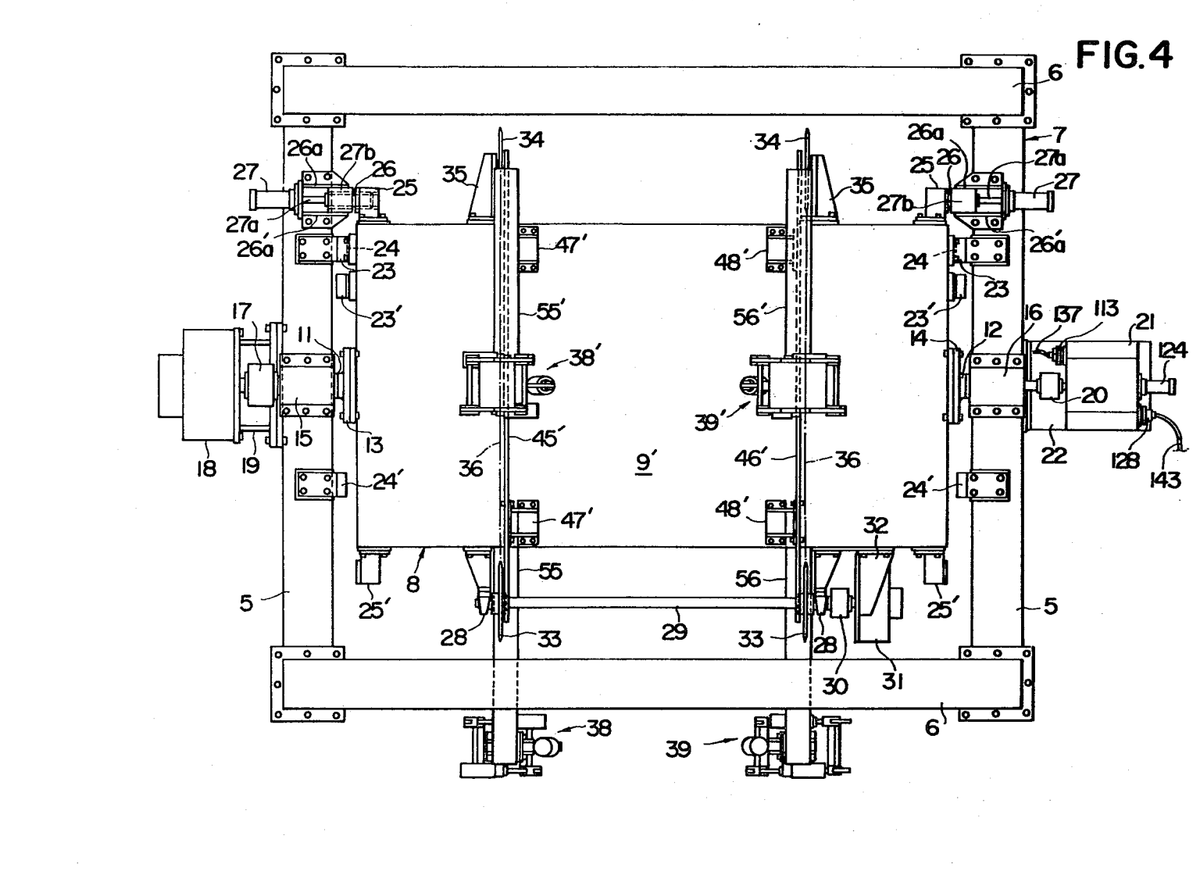

Referring to FIGS. 2 to 4 of the drawings, the embodiment of the present invention comprises four vertical columns 4, two front and rear bolsters 5, and two side bolsters 6. The four vertical columns 4 are upright on a horizontal floor surface and are respectively arranged at the four corners of a horizontal rectangular area. Thus, the four vertical columns 4 consist of two front columns which are seen on a left side portion of FIG. 2 and two rear columns which are seen on a right side portion of FIG. 2. The front and rear bolsters 5 are bolted or otherwise securely fastened at their opposite ends to the tops of the front and rear pairs of vertical columns 4, respectively. On the other hand, the two side bolsters 6 are bolted or otherwise securely fastened at their opposite ends to opposite end portions of the front and rear bolsters 5. The vertical columns 4, front and rear bolsters 5 and side bolsters 6 constitute in combination a frame structure 7 in which the front and rear bolsters 5 extend in transverse directions and the side bolsters 6 extend in fore-and-aft directions of the frame structure.

Between the side bolsters 6 of the frame structure 7 is positioned a rotatable base structure 8 which is composed of a pair of spaced parallel base plates 9 and 9' which are substantially coextensive with each other, and a rectangular framework 10 interposed between the base plates 9 and 9'. The rectangular framework 10 has front and rear walls respectively secured to front and rear end portions of the base plates 9 and 9' and side walls respectively secured to side end portions of the base plates 9 and 9'.

Trunnions 11 and 12 are connected each at one end thereof to the front and rear walls, respectively, of the rectangular framework 10 by means of couplings 13 and 14, respectively, and are arranged to have axes of rotation aligned with each other in a fore-and-aft direction of the frame structure 7, viz., in a direction parallel with the side bolsters 6. The trunnions 11 and 12 are journalled at the other ends in bearing units 15 and 16, respectively, which are supported on respective intermediate portions of the front and rear bolsters 5, respectively. The rotatable base structure 8 is as a whole rotatable about an axis aligned with the respective axes of rotation of the front and rear trunnions 11 and 12 which are rotatably supported by the bearing units 15 and 16, respectively.

The front trunnion 11 is connected by a coupling 17 to the output shaft of an air motor 18 which is supported on the front bolster 5 by means of a bracket 19 as will be best seen in FIG. 2. Thus, the rotatable base structure 8 can be driven for rotation about the axis of rotation thereof when the air motor 18 is in operation.

The rear trunnion 12 is connected at the rear end thereof to a rotary valve unit 20 and a rotary-type electric connector assembly 21, both of which are mounted on a bracket 22 secured to the rear bolster 5. The rear trunnion 12 is formed with an axial bore through which the pipings to supply compressed air to the air motor 18 and other pneumatically operated drive means and the cables and wirings for various electrically operated components are passed into the rotatable base structure 8, though not shown in the drawings. The front trunnion 11 may also be formed with such an axial bore so that the piping for the air motor 18 can be passed from the base structure 8 to the air motor 18 through the bore in the trunnion 11.

The rotatable base structure 8 as a whole is rotatable about the previously mentioned axis of rotation thereof between two substantially horizontal positions which are 180 degrees displaced from each other, viz., between a first horizontal position having one base plate 9 positioned at the bottom of the base structure as shown in FIGS. 2 and 3 and a second horizontal position having the other base plate 9' positioned at the bottom of the base structure. For this purpose, the apparatus according to the present invention further comprises limiting means for preventing the base structure 8 from being rotated beyond these first and second horizontal positions.

In the embodiment herein shown, the limiting means comprises two pairs of stop members 23 and 23' mounted on the rotatable base structure 8 and two pairs of stop members 24 and 24' mounted on the front and rear bolsters 5 as will be best seen in FIG. 4. Of the two pairs of stop members 23 and 23' on the base structure 8, one pair of stop members 23 and 23' are attached to the front wall of the framework 10 and the other pair of stop members 23 and 23' are secured to the rear wall of the framework 10. The two stop members 23 respectively attached to the front and rear walls of the framework 10 are located close to one side wall of the framework 10 and are substantially aligned with each other in a longitudinal or fore-and-aft direction of the base structure 8. The remaining two stop members 23' respectively attached to the front and rear walls of the framework 10 are located laterally inwardly of stop members 23 in lateral directions of the base structure 8 and are also substantially aligned with each other in a longitudinal or fore-and-aft direction of the base structure 8. Of the two pairs of stop members 24 and 24' on the front and rear bolsters 5, on the other hand, one pair of stop members 24 are located to be respectively engageable with the stop members 23 on the base structure 8 when the base structure is in the first horizontal position thereof as shown in FIG. 4 and the other pair of stop members 24' are located to be respectively engageable with the stop members 23' on the base structure 8 when the base structure is in the second horizontal position thereof. When, thus, the base structure 8 is turned into the first horizontal position thereof, the two stop members 23 on the base structure 8 are brought into abutting engagement with the associated stop members 24, respectively, on the front and rear bolsters 5 and prevent the base structure 8 from being turned beyond the first horizontal position thereof in a clockwise direction in FIG. 3. When the base structure 8 is thereafter turned in a counter-clockwise direction in FIG. 3 from the first horizontal position into the second horizontal position thereof, then the two stop members 23' on the base structure 8 are brought into abutting engagement with the associated stop members 24', respectively, on the front and rear bolsters 5 and prevent the base structure 8 from being turned beyond the second horizontal position thereof.

In order to permit the base structure 8 to maintain the first or second horizontal position, the apparatus according to the present invention further comprises locking means operative to lock the base structure 8 in each of the first and second horizontal positions thereof when the base structure is turned into each of the positions. In the embodiment herein shown, such locking means comprises two pairs of locking sleeves 25 and 25' which are mounted on the base structure 8 and which are respectively arranged adjacent the four corners of the base structure 8 as will be best seen in FIG. 4. Of the two pairs of locking sleeves 25 and 25' thus mounted on the base structure 8, one pair of locking sleeves 25 are attached to one side wall of the framework 10 and the other pair of locking sleeves 25' are attached to the other side wall of the framework 10. Each of the locking sleeves 25 and 25' is formed with an axial bore having a center axis in a fore-and-aft or longitudinal direction of the base structure 8 as indicated by broken lines in respect of one of the locking sleeves 25 shown in FIG. 4.

The above mentioned locking means further comprises a pair of locking pins 26 and a pair of fluid-operated, viz., pneumatic or hydraulic power cylinders 27 each having a plunger 27a which is connected at its leading end to each of the locking pins 26. The fluid-operated power cylinders 27 are mounted on the front and rear bolsters 5, respectively, and are arranged in such a manner that the locking pins 26 respectively projecting from the plungers 27a of the cylinders are axially aligned with the axial bores in the locking sleeves 25 when the base structure 8 is held in the first horizontal position thereof as shown in FIG. 4 or with the axial bores in the locking sleeve 25' when the base structure 8 is held in the second horizontal position thereof. When the base structure 8 is held in the first or second horizontal position thereof, the locking pins 26 are thus movable into or out of the axial bores in the locking sleeves 25 or 25', respectively, by making the power cylinders 27 operative or inoperative. To guide the locking pins 26 which are thus moved into or out of the axial bores in the locking sleeves 26, there are provided guide members 27b each of which is mounted on each of the front and rear bolsters 5 by means of a pair of bracket members 26a and 26a'.

The apparatus according to the present invention further comprises carrier means for carrying into the frame structure 7 the components and parts to be assembled to the incomplete assembly 1 which has been conveyed into the frame structure 7. In the embodiment herein shown, such carrier means comprises a pair of bearings 28 which are securely attached to one side wall of the framework 9 of the rotatable base structure 8, and a rotatable shaft 29 axially extending in parallel with a fore-and-aft or longitudinal direction of the base structure 8 and having opposite end portions respectively journalled in the bearings 28. The shaft 29 is securely connected through a coupling 30 to the output shaft of an air motor 31 which is mounted on a bracket 32 secured to the above mentioned side wall of the framework 10 (FIGS. 3 and 4).

Adjacent its opposite ends, the shaft 29 has carried two sprocket wheels 33 which are rotatable with the shaft 29 about the center axis of the shaft 29. The sprocket wheels 33 cooperate with sprocket wheels 34, respectively, which are rotatable on shafts (not shown)

extending in parallel with the shaft 29 and respectively mounted on brackets 35 secured to the other side wall of the framework 10. The sprocket wheels 34 are respectively aligned with the sprocket wheels 33 in lateral directions of the base structure 8. An endless chain 36 is passed between each pair of aligned sprocket wheels 33 and 34 and is arranged in such a manner as to have two straight travelling paths which are spaced in parallel from the outer faces of the base plates 9 and 9', respectively, of the base structure 8 as will be seen in FIG. 3. The air motor 31 is connected to one of the pipings passed into the base structure 8 through the axial bore in the rear trunnion 12.

On the base plates 9 and 9' of the rotatable base structure 8 are detachably mounted die plates 37 and 37', respectively. The die plate 37 detachably attached to the base plate 9 has supported thereon fixtures which are adapted to handle the components and parts for the assemblage of an automotive vehicle of one model or make (which will be hereinafter referred to as vehicles of model "A"). Likewise, the die plate 37' detachably attached to the base plate 9' has supported thereon fixtures which are adapted to handle the components and parts for assembling an automotive vehicle of another model or make (which will be hereinafter referred to as vehicles of model "B").

In the embodiment illustrated in the drawings, the fixture for vehicles of model "A" comprise a first parts loader 38 for conveying the front roof rail 2 from a delivery position outside the frame structure 7 to a predetermined position within the frame structure 7, and a second parts loader 39 for conveying the rear roof rail 3 from a delivery position outside the frame structure 7 to a predetermined position within the frame structure 7. The fixtures for vehicle of model "A" further comprise two sets of first work gauge units 40, two sets of second work gauge units 41, and two sets of third work gauge units 42. The first, second and third work gauge units 40, 41 and 42 are adapted to correct the respective positions of the front pillars 1a, rear pillars 1b and side roof rails 1c, respectively, of the incomplete assembly 1 (indicated by dot-and-dash lines in FIG. 2) of the vehicle body structure conveyed into a predetermined position below the rotatable base structure 8 and to thereafter clamp these structural members of the incomplete assembly 1 in correct predetermined positions thereof. The fixtures for vehicle of model "A" further comprise first and second parts gauge arrangements 43 and 44 by means of which the front and rear roof rails 2 and 3 which have been carried into the predetermined positions within the frame structure 7 by the above described first and second parts loaders 38 and 39 are supported in the positions to be assembled to the incomplete assembly 1.

The first and second parts loaders 38 and 39 are arranged to be capable of travelling along guide rails 45 and 46, respectively, which are secured to the die plate 37 by a pair of brackets 47 and a pair of brackets 48, respectively. The guide rail 45 longitudinally extends alongside the straight travelling path of one of the endless chains 36 along the outer face of the die plate 37. Likewise, the guide rail 46 longitudinally extends alongside the straight travelling path of the other of the endless chains 36 along the outer face of the die plate 37.

The parts loaders 38 and 39 comprise carrier blocks 49 and 50, respectively, which are supported by two sets of rollers 51 and two sets of rollers 52, respectively, and which are thus movable back and forth alongside the guide rails 45 and 46, respectively. As will be seen from the combination of FIGS. 2 and 3 of the drawings, each set of rollers 51 consist of two rollers which are in rollable contact with the upper and lower edges of the guide rail 45 and two pairs of rollers which are in rollable contact with the opposite side faces of the guide rail 45. Similarly, each set of rollers 52 consist of two rollers which are in rollable contact with the upper and lower edges of the guide rail 46 and two pairs of rollers which are in rollable contact with the opposite side faces of guide rail 46.

The carrier blocks 49 and 50 are connected to the chains 33 by means of connector elements 53 and 54, respectively, as shown in FIGS. 2 and 3 so that the carrier blocks 49 and 50 are caused to move along the guide rails 45 and 46, respectively, when the chains 33 are driven to travel along the outer faces of the die plates 37 and 37'.

The carrier blocks 49 and 50 are securely connected to carrier arms 55 and 56, respectively, which extend horizontally from the carrier blocks 49 and 50 as will be best seen in FIG. 3. A pair of fixed clamping pawl members 57 project from a leading end portion of the horizontal carrier arm 55 and, likewide, a pair of fixed clamping pawl members 58 project from an outer end portion of the horizontal carrier arm 56. To these fixed clamping pawl members 57 and 58 pivotally connected fluid-operated power cylinders 59 and 60, respectively, which are further pivotally coupled to pivotable clamping pawl members 61 and 62, respectively, as will be best seen in FIG. 2. The power cylinders 59 and 60 and the pivotable clamping pawl members 61 and 62 are arranged so that, when each of the power cylinders 59 and 60 is actuated, the plunger of the cylinder is caused to project and causes each of the pivotable clamping pawl members 61 and 62 to move toward the associated one of the fixed clamping pawl members 57 and 58. Thus, each of the pivotable clamping pawl members 61 and 62 is pivotally movable between a clamping position and a releasing position with respect to each of the fixed clamping pawl members 57 and 58 when each of the power cylinders 59 and 60 is made operative and inoperative, respectively.

The first, second and third work gauge units 40, 41 and 42 per se have essentially similar constructions which merely differ from one another in the configurations of the respective clamp members to handle the front pillars 1a, rear pillars 1b and side roof rails 1c, respectively. Description will therefor be herein made only in connection with one of the third gauge units 42 with reference to FIG. 3.

The work gauge unit 42 shown in FIG. 3 comprises a bracket 63 which is fixedly connected to the die plate 37, and a fluid-operated main power cylinder 64 pivotally connected to the bracket 63. The work gauge unit 42 further comprises a clamping base member 65 pivotally connected to both of the bracket 63 and the plunger of the power cylinder 64 so that the clamping base member 65 is angularly moved away from the incomplete assembly 1 of the vehicle body structure when the plunger of the power cylinder 64 is caused to retract. To the clamping base member 65 are further pivotally connected a clamping pawl member 66 and a fluid-operated auxiliary power cylinder 67, both of which are arranged in such a manner that the clamping pawl member 66 is moved toward and away from the clamping base member 65 or into and out of a clamping position thereof when the plunger of the auxiliary power cylinder 67 is caused to project forward and retract backward.

The first and second parts gauge arrangements 43 and 44 to handle the front and rear roof rails 2 and 3, respectively, are essentially similar in construction to each other and comprise three pairs of brackets 68 and three pairs of brackets 69, respectively, which are secured to the die plate 37 as shown in FIGS. 2 and 3. To each pair of the brackets 68 and each pair of brackets 69 are pivotally connected turn plates 70 and 71 and fluid-operated first power cylinders 72 and 73, respectively. The plungers of the power cylinders 72 and 73 are pivotally connected to the turn plates 70 and 71, respectively, so that the turn plates 70 and 71 are angularly movable with respect to the associated pairs of brackets 68 and 69, respectively, when the plungers of the associated power cylinders 72 and 73 are moved forward or backward. To the turn plates 70 and 71 are pivotally connected clamping base members 74 and 75 (FIG. 2) and fluid-operated second power cylinders 76 and 77, respectively. The plungers of the second power cylinders 76 and 77 are pivotally connected to the clamping base members 74 and 75, respectively, so that the clamping base members 74 and 75 are angularly movable with respect to the turn plates 70 and 71, respectively, when the plungers of the power cylinders 76 and 77 are moved forward or backward. The parts gauge arrangements 43 and 44 further comprise clamping pawl members 78 and 79 which are pivotally connected to the clamping base members 74 and 75, respectively. The clamping pawl members 78 and 79 are angularly moved toward and away from the clamping base members 74 and 75, respectively, or into and out of respective clamping positions thereof by means of fluid-operated third power cylinders 80 and 81 which are pivotally connected to the clamping base members 74 and 75 and which have plungers pivotally connected to the clamping pawl members 78 and 79, respectively.

The apparatus according to the present invention further comprises connecting means by which the components and parts which have been moved into predetermined positions with respect to the work to be completed are to be welded, brazed, soldered, bolted or otherwise connected to the work. In the embodiment of the present invention, such connecting means are constituted by welding means adapted to weld the front and rear roof rails 2 and 3 to the incomplete assembly 1 of the vehicle body structure.

As illustrated in FIG. 2, the welding means comprises brackets 82 and 83 secured to the lower faces of the front and rear bolsters 5, and front and rear welding robots 84 and 85 supported by the front and rear brackets 82 and 83, respectively. The front and rear welding robots 84 and 85 comprise drive units 86 and 87 and movable support members 88 and 89, respectively, connected to the drive units 86 and 87, respectively. The support members 88 and 89 are movable inwardly and outwardly of the interior of the frame structure 7 in fore-and-aft or longitudinal directions of the frame structure 7. On the support members 88 and 89 are supported fluid-operated power cylinders 90 and 91, respectively, which are pivotally connected to the support members 88 and 89. The plungers of the power cylinders 90 and 91 are pivotally connected to rotatable support members 92 and 93, respectively, which are rotatable with respect to the movable support members 88 and 89, respectively. The rotatable support members 92 and 93 have mounted thereon welding heads 94 and 95, respectively, which are adapted to be made operative or inoperative by means of the power cylinders 96 and 97. The welding robots 84 and 85 thus constructed and arranged are intended to mount the front and rear roof rails 2 and 3, respectively, on the incomplete assembly 1 of the vehicle body structure.

The fixtures for vehicles of model "B" are supported by the die plate 37' and are constructed and arranged essentially similarly to the hereinbefore described fixtures for vehicles of model "A". In FIGS. 2 to 4 of the drawings, the members and units constituting the fixtures for vehicles of model "B" are denoted by reference numerals with primes suffixed to the numerals designating their respective counterparts of the fixtures for vehicles of model "A". The fixtures for vehicles of model "B" differ from the fixture for vehicles of model "A" simply in that the former fixtures are sized to be suitable for the assemblage of vehicles of model "B" while the latter fixtures are dimensioned to be suitable for the assemblage of vehicles of model "A".

The die plates 37 and 37' are detachably attached to the base plates 9 and 9', respectively, of the rotatable base structure 8 as previously described. To facilitate mounting of the die plates 37 and 37' on the base plates 9 and 9', respectively, quick piping joints and quick wiring connectors (not shown) may be provided between the rotatable base structure 8 and each of the die plates 37 and 37'. With such joint and connector arrangements, the pipings and wirings passed through the rotary valve 20 and the rotary-type electric connector assembly 21 as previously described are connected through the quick piping joints and quick wiring connectors to the various fluid-operated drive units and electric control units included in the fixtures supported by the die plates 37 and 37'. When the die plates 37 and 37' and the fixtures supported thereby are to be exchanged with other ones, the drive and control units included in the fixtures supported by the new die plates can thus be easily connected to the pipings and wirings in the rotatable base structure 8.

Description will be hereinafter made regarding the manners in which the two-shift automatic assembling apparatus constructed and arranged as hereinbefore described operates.

Prior to assemblage of the front and rear roof rails 2 and 3 to the incomplete assembly 1 of the vehicle body structure, the incomplete assembly 1 is conveyed into a predetermined position lower than the position in which the incomplete assembly 1 is ready to be installed with the roof rails 2 and 3, the lower position being indicated by dots-and-dash lines in FIG. 3. The incomplete assembly 1 of the vehicle body structure is thereafter raised by suitable lifting means (not shown) into the position ready to be installed with the roof rails 2 and 3 as indicated by dot-and-dash lines in FIG. 3. Before the incomplete assembly 1 of the vehicle body structure is thus moved into the raised position, all of the first, second and third work gauge units 40, 41 and 42 are maintained in conditions which do not interfere with the upward movement of the incomplete assembly 1. Under these conditions, the plunger of the main power cylinder 64 of each of the third work gauge units 42, for example, is held in a retracted position thereof and thus maintains the clamping base member 65 in a limit angular position which the base member is permitted to assume when turned in a direction indicated by an arrow in FIG. 3. With the clamping base member 65 held in such a limit angular position, the clamping pawl member 66 and the auxiliary power cylinder 67 are held outside the path of the incomplete assembly 1 of the vehicle body structure being moved upwardly. The auxiliary power cylinder 67 held in such a position is maintained in a condition having its plunger retracted and thereby holding the clamping pawl member 66 in the releasing position thereof. The first and second work gauge units 40 and 41 are conditioned similarly to the third work gauge units 42 and permit the incomplete assembly 1 of the vehicle body structure to move upwardly into the raised position without being interfered with by the work gauge units 40 and 41.

After the incomplete assembly 1 of the vehicle body structure is moved into the raised position indicated by the dot-and-dash lines in FIG. 3, then the first, second and third work gauge units 40, 41 and 42 operate to correct the respective positions of the front pillars 1a, rear pillars 1b and side roof rails 1c of the incomplete assembly 1 in the raised position and to thereafter securely hold these structural portions of the incomplete assembly 1 in correct predetermined positions thereof. Such operation of the work gauge units 40, 41 and 42 proceeds in such a manner that is described below in connection with the mode of operation of one of the third work gauge units 42.

When the incomplete assembly 1 of the vehicle body structure is stabilized in the raised position, the main power cylinder 64 of each of the work gauge units 42 is actuated to project its plunger and thereby causes the clamping base member 65 to turn in a direction opposite to the direction of the arrow in FIG. 3 until the base member 65 reaches the angular position illustrated in FIG. 3. Thereafter, the auxiliary power cylinder 67 which has been held in a condition having its plunger retracted is also actuated to project the plunger and causes the clamping pawl member 66 to turn into the clamping position thereof as shown in FIG. 3. The side roof rail 1c of the incomplete assembly 1 is in this fashion seized between the clamping base member 65 and the clamping pawl member 66 and is thus correctly held in the predetermined position below the rotatable base structure 8. In similar manners, the front and rear pillars 1a and 1b are moved into the correct predetermined positions thereof below the base structure 8.

While the work gauge units 40, 41 and 42 are operating in the above described manners, the air motor 31 forming part of the previously mentioned carrier means is actuated to drive the shaft 29 to turn about the center axis thereof. The rotation of the shaft 29 is carried to the two sprocket wheels 33 on the shaft 29 and causes the endless chains 36 to travel along the outer faces of the die plates 37 and 37' on the base structure 8. The movement of the endless chains 33 causes the carrier blocks 49 and 50 and accordingly the first and second parts loaders 38 and 39 to move alongside the guide rails 45 and 46, respectively, until the loaders 38 and 39 reach predetermined take-up positions illustrated in FIG. 3. Under these conditions, the power cylinders 59 and 60 are held in the conditions having their plungers in the retracted positions so that the clamping pawl members 61 and 62 connected to these cylinders are maintained in the release positions thereof. The first and second parts loaders 38 and 39 are thus ready to take up the front and rear roof rails 2 and 3, respectively.

When the front roof rail 2 is thus positioned between the clamping pawl members 57 and 61 of the first parts loader 38 and the rear roof rail 3 is positioned between the clamping members 58 and 62 of the second parts loader 39, then the respective power cylinders 59 and 60 of the loaders 38 and 39 are actuated to project their plungers downward and cause the pivotable clamping pawl members 61 and 62 to turn in directions opposite to the directions of arrows in FIG. 2 until the pawl members 61 and 62 reach their respective clamping positions shown in FIG. 2. In these manners, the front roof rail 2 is clamped between the clamping pawl members 57 and 61 and, likewise, the rear roof rail 3 is clamped between the clamping pawl members 58 and 62, as illustrated in FIG. 2.

After the front and rear roof rails 2 and 3 are thus retained by the first and second parts loaders 38 and 39, the air motor 31 is caused to turn its output shaft in the reverse direction so that the parts loaders 38 and 39 are moved rightward in FIG. 3 (or upward in FIG. 4) from their respective take-up positions illustrated in FIG. 3. The air motor 31 is brought to a stop when the first and second parts loaders 38 and 39 reach predetermined stand-by positions above the incomplete assembly 1 of the vehicle body structure.

In the meantime, the respective third power cylinders 80 and 81 of the first and second parts gauge arrangements 43 and 44 are held in conditions having their plungers retracted so that the clamping pawl members 78 and 79 respectively connected to the plungers are held in their release positions which are angularly displaced in the directions of the arrows in FIG. 2 from their; respective clamping positions shown in FIG. 2. Thus, the parts gauge arrangements 43 and 44 are ready to take-up the front and rear roof rails 2 and 3, respectively, which have been carried by the first and second parts loaders 38 and 39.

When the respective first power cylinders 72 and 73 of the first and second parts gauge arrangements 43 and 44 are actuated to project their plungers downward, the turn plates 70 and 71 pivotally connected to the plungers are caused to turn in directions indicated by the arrows in FIG. 2. As a consequence, the clamping base members 74 and 75 respectively connected to the turn plates 70 and 71 are brought into contact with the respective lower faces of the front and rear roof rails 2 and 3 supported by the first and second parts loaders 38 and 39, respectively. When the power cylinders 80 and 81 are actuated to project their plungers under these conditions, the clamping pawl members 78 and 79 which have been held in their respective release positions as above mentioned are caused to turn in directions opposite to the directions of the arrows in FIG. 2 and are brought into contact with the respective upper faces of the front and rear roof rails 2 and 3, respectively. In these manners, the front roof rail 2 is clampled between the clamping base and pawl members 74 and 78 of the first parts gauge arrangement 43, while the rear roof rail 3 is clamped between the clamping base and pawl members 75 and 79 of the second parts gauge arrangement 44.

Thereafter, the power cylinders 59 and 60 of the first and second parts loaders 38 and 39, respectively, are operated to retract their plungers upward and cause the clamping pawl members 61 and 62 to turn back into their respective release positions. This result is that the front and rear roof rails 2 and 3 which have been supported by the first and second parts loaders 38 and 39 are transferred to the first and second parts gauge arrangements 43 and 44, respectively. When the power cylinders 72 and 73 are for a second time actuated to project their plungers downward and thereby cause the turn plates 70 and 71 to turn into the initial angular positions illustrated in FIG. 2, the front and rear roof rails 2 and 3 retained by the first and second parts gauge arrangements 43 and 44 are brought into predetermined ready-for-assembly positions (indicated by 2′ and 3′, respectively, in FIG. 2) adapted to be installed on the incomplete assembly 1 of the vehicle body structure.

The ready-for-assembly positions of the front and rear roof rails 2 and 3 will usually differ between vehicles of the sedan types and vehicles of hardtop types. The adjustment of the ready-for-assembly positions of the roof rails 2 and 3 between sedan-type vehicles and hardtop types can be effected by means of the second power cylinders 76 and 77 of the first and second parts gauge arrangements 43 and 44, respectively. The power cylinders 76 and 77 are then operated to project or retract their plungers so that the clamping base members 74 and 75 pivotally connected to the power cylinders are turned in either directions with respect to the turn plates 70 and 71, respectively. By such angular movements of the clamping base members 74 and 75, the front and rear roof rails 2 and 3 respectively retained to the base members 74 and 75 are moved into proper positions with respect to the incomplete assembly 1 of the vehicle body structure.

When the front and rear roof rails 2 and 3 are held in the ready-for-assembly positions respectively indicated by 2′ and 3′ in FIG. 2, the drive units 86 and 87 of the front and rear welding robots 84 and 85, respectively, are actuated to move the welding heads 94 and 95 inwardly of the frame structure 7 into predetermined operative positions illustrated in FIG. 2. The power cylinders 90 and 91 are thereafter operated to minutely adjust the positions of the welding heads 94 and 95, respectively, whereupon the power cylinders 96 and 97 are actuated to put the welding heads 94 and 95 into operation to spot weld the front and rear roof rails 2 and 3 to the incomplete assembly 1 of the vehicle body structure.

Upon completion of the installation of the roof rails 2 and 3 on the incomplete assembly 1 of the vehicle body structure, the welding heads 94 and 95 are caused to withdraw from their operative positions shown in FIG. 2 by means of the drive units 86 and 87, respectively.

The power cylinders 80 and 81 of the first and second parts gauge arrangements 43 and 44, respectively, are then operated to retract their plungers and cause the clamping pawl members 78 and 79 to turn into the respective release positions thereof. Subsequently, the power cylinders 76 and 77 are likewise operated to retract their plungers so that the clamping base members 74 and 75 are caused to turn in the directions of the arrows in FIG. 2 from their respective angular positions illustrated in FIG. 2. The clamping base members 74 and 76 are, as a consequence, detached and withdrawn downward from the front and rear roof rails 2 and 3, respectively, which have been mounted on the initially incomplete assembly 1 of the vehicle body structure.

The vehicle body structure which is now complete with the front and rear roof rails 2 and 3 is ready to be moved from the raised position indicated by the dot-and-dash lines in FIG. 2 to the lower position indicated by the dot-and-dash lines in FIG. 3 by the previously mentioned lifting means (not shown). When the vehicle body structure is thus moved into the lower position with respect to the frame structure 7, the body structure is conveyed forward for subsequent step of operation in the production line of automotive vehicles.

By repetition of the cycles of operation hereinbefore described, incomplete assemblies of vehicle body structures conveyed in succession into the assembly station within the frame structure 7 are completed as long as the vehicle body structures are for vehicles of model "A". If and when an incomplete assembly of a body structure for a vehicle of model "B" is conveyed subsequently to the incomplete assembly 1 of the body structure for a vehicle of model "A", the fixtures for the vehicle of model "A" are replaced with the fixtures for vehicles of model "B" in response to a signal indicative of such a change between the vehicle models. The signal may be supplied from a computer in a central control room or from suitable vehicle model discriminating means provided in the production line upstream of the assembly station for the front and rear roof rails.

When such a signal is issued from the computer or the vehicle model discriminating means, the air motor 31 is actuated to move the first and second parts loaders 38 and 39 to positions below a laterally middle portion of the rotatable base structure 8 by means of the endless chains 36. Since, in this instance, the endless chains 36 are also connected by the connector elements 53′ and 54′ to the first and second parts loaders 38′ and 39′ included in the fixtures for vehicles of model "B", these parts loaders 38′ and 39′ are moved to positions above the laterally middle portion of the base structure 8 concurrently when the parts loaders 38 and 39 for vehicles of model "A" are moved to the above mentioned positions thereof.

When the two pairs of parts loaders 38, 39, 38′ and 39′ are thus moved into these intermediate positions with respect to the rotatable base structure 8, the air motor 31 is brought to a stop and, in turn, the power cylinders 27 on the front and rear bolsters 5 are actuated to retract their plungers. This causes the locking pins 26 to withdraw from the axial bores in the locking sleeves 25, respectively, thereby unlocking the rotatable base structure 8 from the frame structure 7. Subsequently, the air motor 18 is actuated to drive the rotatable base structure 8 through the coupling 17 and the front trunnion 11 for causing the base structure to turn in a counterclockwise direction in FIG. 3 about the axis of rotation of the base structure. When the base structure 8 is thus turned, those members on the base structure which are remotest from the axis of rotation of the base structure describe a cylindrical path about the axis as indicated by a circle 98 in FIG. 3 and is permitted to make a half turn without being obstructed by any stationary structural member of the assembling apparatus.

When the rotatable base structure 8 is turned in the counter-clockwise direction in FIG. 3 from the previously mentioned first horizontal position thereof, the stop members 23 on the base structure 8 are disengaged from the stop members 24 on the front and rear bolsters 5, respectively. At the point of time when the rotatable base structure 8 has made a half turn from the first horizontal position thereof, the stop members 23′ on the base structure 8 are respectively brought into abutting engagement with the stop members 24′ on the front and rear bolsters 5 and thereby prevent the base structure beyond the second horizontal position thus reached.

When the base structure 8 is turned into the second horizontal position thereof, the air motor 18 is brought to a stop and, thereafter, the power cylinders 27 which have been held in the conditions having their plungers retracted as above described are actuated to project the plungers. This causes the locking pins 26′ to move into the axial bores in the locking sleeves 26' which are mounted on the opposite side of the base structure 8 to the locking sleeves 26.

The rotatable base structure 8 is now locked in the second horizontal position thereof and, as a consequence, has the die plates 37 and 37' at the top and bottom, respectively, of the base structure 8 though not illustrated in the drawings. The fixtures supported by the die plate 37' thus facing downward are ready to install the front and rear roof rails on the incomplete assembly for the body structure of a vehicle of model "B". It will be apparent that the manners in which the front and rear roof rails for a vehicle of model "B" are to be attached to the incomplete assembly of the body structure for the vehicle of model "B" are essentially similar to the previously described manners of installation of the roof rails 2 and 3 for a vehicle of model "A".

While the rotatable base structure 8 is being turned from the first horizontal position to the second horizontal position thereof as above described, the rotary valve unit 20 and the rotary-type electric connector assembly 21 are automatically operated so that the pipings and wirings which have been connected to the drive and control units of the fixtures for vehicles of model "A" are disconnected therefrom and are connected to those of the fixtures for vehicles of model "B".

As will have been understood from the foregoing description, one of the outstanding features of the two-shift automatic assembling apparatus according to the present invention is the arrangement in which two sets of fixtures operable for the assemblage of works of two different models or makes are mounted on the upper and lower faces of the rotatable base structure 8. The two sets of fixtures can be selectively put to use depending upon the models or makes of the works to be assembled, facilitating two-shift assemblage of two types of works in a single production line and giving rise to a decrease in the cost for the production equipment. Such an advantage will be pronounced especially when it is desired to produce automotive vehicles of two different models as in the case where vehicles of an existing model are to be remodelled. Conventionally, it has been required for automobile manufactures to set up an assembly line for the production of remodelled vehicles while maintaining the existing assembly line for vehicles of the old model for a certain period of time after vehicles of the new model are put on the market. In view of the fact that such a period of time is usually comparatively short, provision of the two assembly lines burdens the automotive manufacturers with increased costs for the installation of production equipment. The two-shift automatic assembling apparatus according to the invention will contribute to remarkably increasing the importance of the existing production equipment during such a transient period of time.

Another outstanding feature of the apparatus according to the present invention is that the rotary valve unit 20 and the rotary-type electric connector assembly 21 are constructed and arranged to permit the pipings and wirings to be selectively connected to the fixtures on both sides of the rotatable base structure 8. When the rotatable base structure 8 is turned upside down and the fixtures operable are charged, the pipings and wirings are automatically disconnected from the fixtures out of use and connected to the fixture to be put to use. Thus, no extra labors are required for the re-piping and rewiring of the assembling apparatus when the fixtures to be put into operation are changed.

Because, furthermore, the two sets of fixtures are mounted on the base structure 8 by means of the two die plates 37 and 37', respectively, the fixtures can be easily and rapidly installed on and dismantled from the base structure 8. If, in this instance, quick piping joints and quick wiring connectors are provided in predetermined array between the rotatable base structure 8 and each of the die plates 37 and 37', the pipings and wirings extending from the rotary valve unit 20 and the rotary-type electric connector assembly 21 to the rotatable base structure 8 can be automatically connected to the drive and control units of the fixtures when the die plates 37 and 37' are attached to the base structure 8. Thus, the labors which would otherwise be required for the disconnection and re-connection of pipings and wirings can be dispensed when the fixtures are to be attached to and detached from the base structure 8, providing ease and enhanced efficiency of the mounting and dismantling of the fixtures.

FIGS. 5 to 8 show the detail construction and arrangement of the rotary-type electric connector assembly 21 included in the embodiment hereinbefore described with reference to FIGS. 2 to 4.

Figure 5:
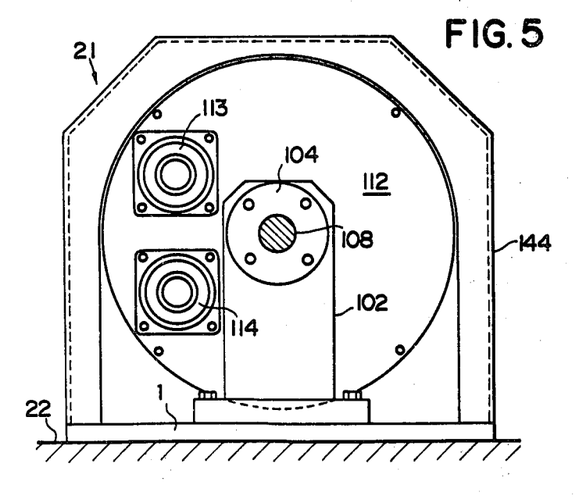
FIG. 5 is a front end view of a rotary-type electric connector assembly forming part of the apparatus illustrated in FIGS. 2 to 4.
Figure 6:
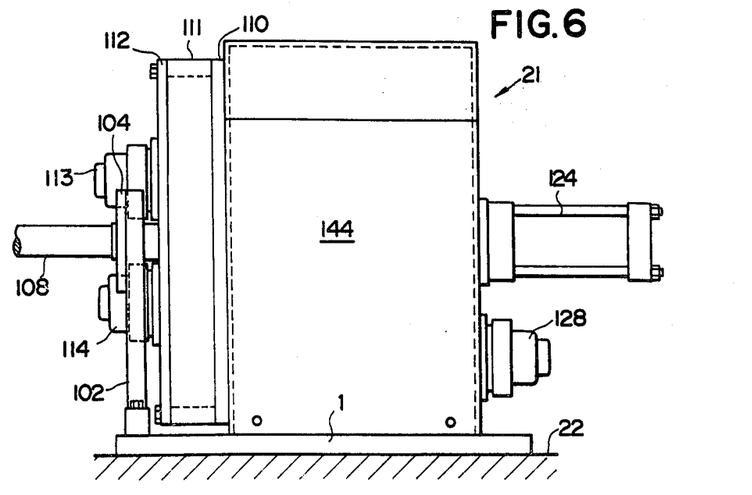
FIG. 6 is a side elevation of the connector assembly shown in FIG. 5.
Figure 7:
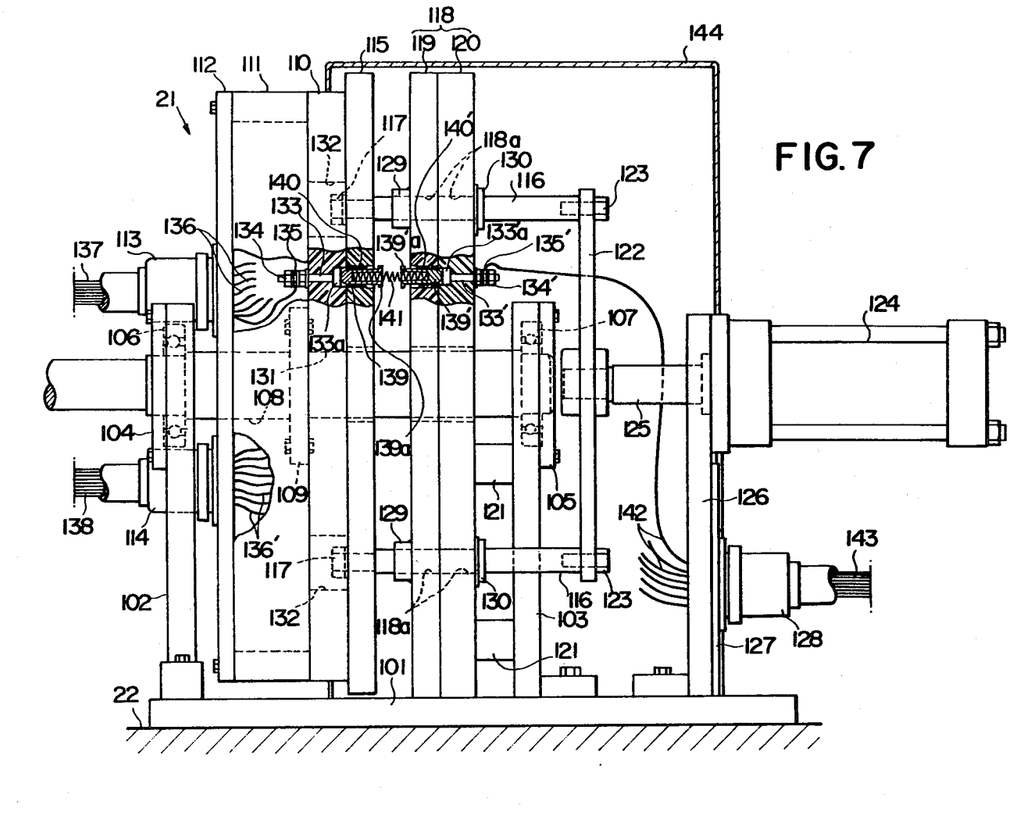
FIG. 7 is a side elevation showing, to an enlarged scale and partially in section, the internal construction of the connector assembly shown in FIGS. 5 and 6.

As shown in FIGS. 5 to 7, the connector assembly 21 comprises a stationary base plate 101 bolted or otherwise securely connected to the previously mentioned bracket 22, and a pair of vertical bearing support members 102 and 103 upstanding from the upper face of the base plate 101 as will be best seen in FIG. 7. The bearing support members 102 and 103 are spaced apart in parralel from each other and have bearing retainers 104 and 105 arranged to retain bearings 106 and 107 supported in the bearing support members 102 and 103, respectively.

A rotatable main shaft 108 is journalled in these bearings 106 and 107 and is thus rotatably supported on the bearing support members 104 and 105. The rotatable main shaft 108 has a center axis substantially aligned with the axis of rotation of the rotatable base structure 8 of the assembling apparatus illustrated in FIGS. 2 to 4 and is connected at its end opposite to the bearing 107 to the rear trunnion 12 connected to the base structure 8 through the rotary valve 20 and coupling 14 (FIGS. 2 and 4).

The main shaft 108 has an annular flange portion 109 which is located intermediate between the bearings 106 and 107. The annular flange portion 109 is screwed or otherwise securely attached to a disc-shaped first contact block 110 which has a center axis substantially coincident with the center axis of the main shaft 108 and which is constructed of an electrically insulating material. The first contact block 110 has securely attached to its end face closer to the front bearing support member 102 a ring-shaped spacer 111 fastened to a disc-shaped connector support plate 112. The spacer 111 is thus connected at one axial end to the first contact block 110 and at the other to the connector support plate 112. As will be described in more detail, the connector support plate 112 is adapted to support two, first and second, connector units 113 and 114.

Between the first contact block 110 and the rear bearing support member 103 is positioned a disc-shaped second contact block 115 which has a center axis substantially coincident with the center axis of the main shaft 108 and which is also constructed of an electrically insulating material. The second contact block 115 is formed with four holes which are arranged substantially symmetrically with respect to the center axis of the main shaft 108, only two of the holes being indicated by broken lines in FIG. 7. Respectively through these holes in the second contact block 115, four guide rods 116 (only two of which are seen in FIG. 7) are securely connected to the contact block 115 and longitudinally extend substantially in parallel with the center axis of the main shaft 108. Each of the guide rods 116 has a threaded end portion axially projecting from the front end face of the second contact block 115 into the first contact block 110 and has a nut 117 carried on the threaded end portion. The second contact block 115 is further formed with a central bore encircling an axial portion of the main shaft 108 and sized to loosely pass the main shaft 108 therethrough. The second contact block 115 is thus axially movable on the main shaft 108 together with the four guide rods 116 while allowing the main shaft 108 to turn about its center axis with respect to the contact block 115. On the other hand, the first contact block 110 is axially held in fixed position but is rotatable with the main shaft 108 together with the connector support member 112 and the first and second connector unit 113 and 114.

The connector assembly 21 illustrated in FIGS. 5 to 7 further comprises a stationary guide block 118 which consists of two, first and second, disc-shaped component members 119 and 120 which are securely held together, each of the component members 119 and 120 being constructed of an electrically insulating material. The stationary guide block 118 has a center axis substantially coincident with the center axis of the main shaft 108 and is formed with a central bore encircling an axial portion of the main shaft 108 and sized to loosely pass the main shaft therethrough for allowing the main shaft 108 to turn about the center axis thereof to the contact block 118. The guide block 118 is further formed with four guide holes 118a respectively aligned with the four holes in the second contact block 115. The guide rods 116 secured to the second contact block 115 axially project from the rear end face of the contact block 115 and are loosely passed through these guide holes 118a, respectively, in the guide block 118 so as to be axially movable through the holes 118a with respect to the guide block 118.

The guide block 118 thus constructed is connected to the rear bearing support member 103 by means of a spacer element 21 and is positioned on the upper face of the base plate 101.

The guide rods 116 axially extends through the holes 118a in the guide block 118 and further project rearward beyond the guide block 118. The individual guide rods 116 are connected at their ends projecting from the guide block 118 to a connector plate 122 which is fixedly attached to the guide rods 116 by means of screws 123, respectively. The guide rods 116 are thus connected together by the connector plate 122.

The connector assembly 21 illustrated in FIGS. 5 to 7 further comprises drive means constituted by a fluid-operated power cylinder 124 having a plunger 125 and supported by a cylinder support member 106 upstanding from the base plate 101. The plunger 125 of the power cylinder 124 is connected at its leading or foremost end to a central portion of the above described connector plate 122. The connector plate 122, guide rods 166 and second contact block 115 are, thus, movable as a single unit together with the plunger 125 of the power cylinder 124. The cylinder support member 126 has attached thereto a connector support plate 127 supporting a third connector unit 128.

The individual guide rods 126 are axially movable together through the holes 118a in the guide block 118. To limit the movement of the guide rods 116 away from the first contact block 110, the guide block 118 has attached to its end face confronting the second contact block 115 a plurality of stop elements 129 axially projecting a predetermined length from the outer or front end face of the first component member 119 of the guide block. When the guide rods 116 are axially moved away from the first contact block 110, the second contact block 115 is moved together with the guide rods 116 away from the first contact block 110 until the second contact block 115 is brought into contact with these stop elements 129 and is thereby prevented from being further moved away from the first contact block 110. On the other hand, the movement of the guide rods 116 toward the first contact block 110 is limited by a flange 130 which is securely attached to or formed on each of the guide rods 116 and which is located outside or at the rear of the outer end face of the second component member 120 of the guide block 118. The flanges 129 are located at a predetermined distance from the rear end face of the second contact block 115 so that when the guide rods 116 are axially moved toward the first contact block 110, the guide rods are permitted to move until the flanges 129 are brought into contact with the rear end face of the guide block 118. In these manners, the second contact block 115 is axially movable with respect to the first contact block 110 and the guide block 118 between a first position having the flanges 129 contacted by the guide block 118 and a second position contacted by the stop elements 129.

Figure 8:
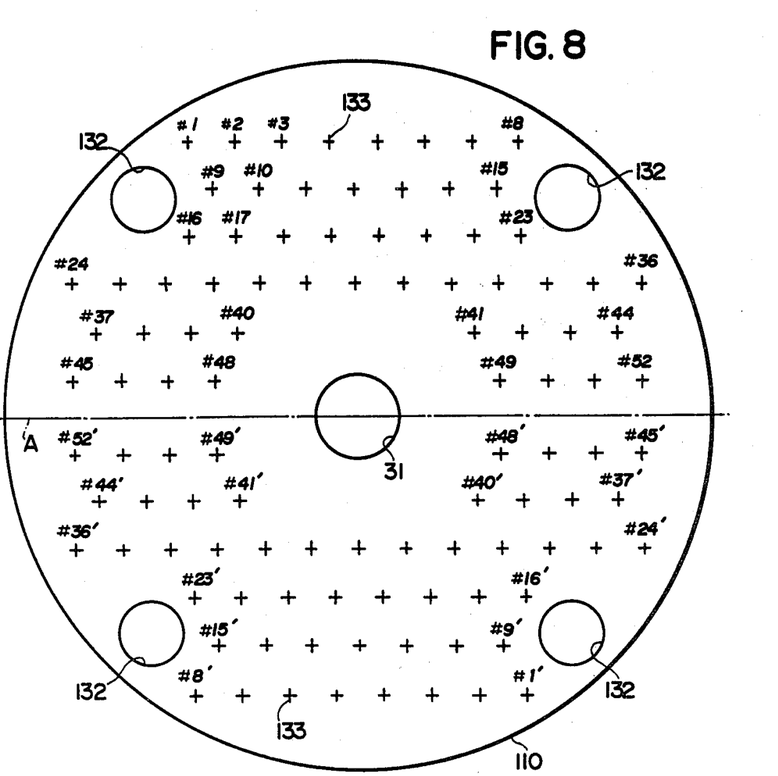
FIG. 8 is a schematic view showing the arrangement of contact elements carried by a contact block included in the connector assembly shown in FIGS. 5 to 7.

The first contact block 110 is formed with a central bore 131 having the main shaft 108 securely passed therethrough and further with four openings 132 through which the nuts 117 carried on the guide rods 116 are allowed to axially move with respect to the first contact block 110. The first contact block 110 is provided with two, first and second, sets of contact elements 133 each having an enlarged head portion 133a as shown in FIG. 7. As will be more clearly seen from FIG. 8, the two sets of contact elements 133 are arranged within two semicircular halves, respectively, of the cross sectional area of the contact block 110, the two semicircular halves being shown to be bounded by each other across a boundary line A in FIG. 8. The contact elements 133 arranged within one of the semicircular halves have their respective counterparts in the contact elements 133' within the other semicircular half and are respectively located in symmetry to the latter contact elements with respect to the center axis of the contact block 110. In FIG. 8, each set of contact elements is assumed to consist of a total of 52 elements and the individual pairs of the respectively corresponding contact elements 133 and 133' are indicated by numbers #1 to #52 and numbers #1' to #52', respectively. When the contact block 110 is turned through 180 degrees about the center axis thereof, the positional relationship between the two semicircular halves of the cross sectional area of the block 110 is inverted and, as a consequence, the positions which have been occupied by one set of contact elements 133 are respectively taken over by the other set of contact elements 133'.

As illustrated in FIG. 7, each of the contact elements 133 is in part embedded in the first contact block 110 in such a manner that the enlarged head portion 130a is directed and exposed toward the second contact block 115. Each of the contact elements 113 further has a threaded end portion axially projecting from the front end face of the second contact block 115 toward the connector support plate 112 and has a nut 134 fitted to the threaded end portion so as to have a terminal element 135 detachably fastened thereto. The individual terminal elements 135 thus fastened to the two sets of contact elements 133 are connected to two sets of wires 136 and 136' and through these wires to the previously mentioned first and second connector units 113 and 114, respectively. The first and second connector units 113 and 114 in turn are connected to cables 137 and 138 which are connected to the electrically operated control units (not shown) of the fixtures mounted on the die plates 37 and 37', respectively, on the rotatable base structure 8 shown in FIGS. 2 and 3.

The second contact block 115 is provided with a single set of contact elements 139 which are arranged respectively in alignment with the contact elements 133 arranged within one of the semicircular halves of the cross sectional area of the first contact block 110. Each of the contact elements 139 is axially slidable through a guide sleeve 140 which is securely embedded in the contact block 115 and which is open at one end toward the first contact block 110 and at the other toward the guide block 118. Furthermore, each contact element 139 has a rounded end portion directed toward the first contact block 110 and has forment at its end opposite to the rounded end portion an annular flange portion 139a which is located adjacent the rear end face of the second contact block 115.

The guide block 118 is also provided with a single set of contact elements 133' which are arranged similarly but in axially inverted relationship to the contact elements 133 arranged within one of the semicircular halves of the cross sectional area of the first contact block 110. More particularly, each of the contact elements 133' has an enlarged head portion 133'a and is in part embedded in the second component member 120 of the guide block 118 in such a manner as to have the enlarged head portion 133'a directed and exposed toward the first component member 119 of the guide block 118. Each of the contact elements 133' further has a threaded end portion axially projecting from the outer end face of the component member 120 toward the connector plate 122 and has a nut 134' fitted to the threaded end portion so as to have a terminal element 135' detachably fastened thereto.

The guide block 118 has further provided in its first component member 119 a set of contact elements 139' which are arranged respectively in alignment with the contact elements 133' in the second component member 120 of the block 118. Each of the contact elements 139' is axially slidable through a guide sleeve 140' which is fixedly embedded in the component member 119 and which is open at one end toward the second contact block 115 and at the other at the junction between the first and second component members 119 and 120 of the guide block 118. Furthermore, each contact element 139' has a rounded end portion directed toward the enlarged head portion 133'a of each of the contact elements 133' in the second component member 120 and has formed at its end opposite to the rounded end portion thereof an annular flange portion 139'a which is located adjacent the outer end face of the first component member 119.

Between each pair of aligned contact elements 139 and 139' is provided an electrically conductive, helical compression spring 141 urging the aligned contact elements 139 and 139' to axially move away from each other. The aligned contact elements 139 and 139' are, thus, axially forced against the respectively associated or aligned contact elements 133 and 133'. The individual terminal element 135' respectively fastened to the terminal elements 133' are connected to the previously mentioned third connector unit 128 through wires 142. The connector unit 128 in turn is connected to a cable 143 leading from sources (not shown) of power and control signals. The contact arrangement above described is encased within a housing 144 for protecting the contact arrnagement from moisture and dust.

Description will be hereinafter made regarding the operation of the connector assembly 21 constructed and arranged as hereinbefore described.

Under the conditions illustrated in FIG. 7, electrical connection is established between the first and third connector units 113 and 128. Such connection is provided through the wires 142, terminal elements 135', contact elements 133' and 139', spring 141, contact elements 39 and 33, terminal elements 135, and wires 136. Of the two sets of contact elements 133 in the first contact block 110, the contact elements 133 arranged within the upper semicircular half of the cross sectional area of the contact block 110 shown in FIG. 8 are thus made operable. The currents supplied from the sources of power and control signals are fed from the cable 143 to the cable 137 and through the cable 137 to the various control units included in the fixtures on the die plate 37 on the rotatable base structure 8 (FIGS. 2 and 3).

When the rotatable base structure 8 shown in FIGS. 2 and 3 is turned upside down so as to change the fixtures to be put into operation, the main shaft 108 of the connector assembly 21 is turned through 180 degrees about its center axis in a clockwise direction in FIG. 5.

Before the base structure 8 and the main shaft 108 are thus caused to make a half turn, the power cylinder 124 of the connector assembly 21 is actuated to retract its plunger 125 rearward, viz., rightward in FIG. 7. This causes the connector plate 122 and guide rods 116 to axially move away from the first contact block 110. As the guide rods 116 are thus moved away from the first contact block 110 through the guide holes 118a, respectively, in the stationary guide block 118, the second contact block 115 is also moved axially away from the first contact block 110 along the center axis of the main shaft 108. During such movement of the second contact block 115, the guide sleeves 140 in the contact block 115 are respectively brought into abutting engagement with the flange portions 139a of the associated contact elements 139. It therefore follows that the contact elements 139 in the guide sleeves 140 are caused to axially move together with the second contact block 115 toward the contact elements 139', respectively, in the guide block 118 against the forces of the springs 141. The movement of the guide rods 116 and the second contact block 115 proceeds until the contact block 115 is received on the stop elements 129 on the guide block 118. When the second contact block 115 is thus moved into the previously mentioned second position thereof, the contact elements 139 in the second contact block 115 are respectively spaced apart from the associated contact elements 133 in the first contact block 110.

After the contact elements 139 are in this fashion disconnected from the contact elements 133, the air motor 18 (FIGS. 2 and 4) is actuated to drive the rotatable base structure 8 to turn upside down. The rotation of the base structure 8 is followed by rotation of the main shaft 108 of the connector assembly 21 and further by rotation of the first contact block 110 through 180 degrees about the center axis of the main shaft 108.

As a result of the half turn of the main shaft 108 from the initial angular position thereof, the contact elements 133 which are shown arranged within the lower semicircular half of the first contact block 110 in FIG. 8 are moved into the position respectively aligned with the contact elements 139 in the second contact block 115. Under these conditions, the power cylinder 124 is operated to project its plunger forward, viz., leftward in FIG. 7 so that the connector plate 122 and the guide rods 116 are moved together toward the first contact block 110. Such movement of the guide rods 116 is followed by movement of the second contact block 115 toward the first contact block 110 until the flanges 130 on the guide rods 116 are brought into abutting contact with the outer face of the second component member 120 of the stationary guide block 118. The second contact block 115 is thus moved into the previously mentioned first position thereof contacted by the rear end face of the first contact block 110. The contact elements 139 carried by the second contact block 115 are now respectively contacted by those contact elements 133 in the first contact block 110 which have been located within the lower semicircular half of the contact block 110 in the original angular position. Electrical connection is thus established from the third connector unit 128 to the second connector unit 114 through the wires 142, terminal elements 135', connector elements 133' and 139', springs 141, connector elements 139 and 133, terminal elements 135 and wires 136'. The currents supplied from the sources of power and control signals are now fed from the cable 143 to the cable 138 and through the cable 138 to the control units included in the fixtures mounted on the die plate 37' on the rotatable base structure 8 shown in FIGS. 2 and 3.

From the foregoing description, it will have been understood that the rotary-type electric connector assembly forming part of the apparatus according to the present invention festures, inter alia, the arrangement in which one of the two contact blocks (viz., the second contact block 115 in the embodiment shown) is spaced apart from the other contact block (which is the first contact block 110 in the embodiment shown) before one set of contact elements which have been in use are to be replaced with the other set of contact elements. By virtue of such arrangement, the contact elements carried by the contact block moved away from the other contact block are prevented from sliding on the latter during replacement of the contact elements to be put into operation. This will contribute to elimination of the wear and abrasion of the two contact blocks and the contact elements carried by the contact blocks and will accordingly provide a prolonged service life of the contact assembly.

Because, furthermore, all the contact elements to be disconnected from the contact elements to be replaced are carried by a single contact block which is common to the contact elements to be disconnected, the former contact elements can be moved simply by moving the contact block common to them. In this instance, the two contact blocks are prevented from being caused to slide on each other and will assure a further prolonged service life of the connector assembly as a whole.

Another outstanding feature of the contact assembly forming part of the apparatus embodying the present invention is that the cables 137 and 138 extend between the base structure 8 and the connector support plate 112 and that the two bundles of wires 136 and 136' extend between the connector support plate 112 and the first contact block 110. Since, in this instance, the first contact block 110 and the connector support plate 112 are turned together with the main shaft 108 and the base structure 8, the wires 136 and 136' and the cables 137 and 138 are prevented from being twisted during exchange of the fixtures to be put into operation. There being no fear that the wires 136 and 136' and cables 137 and 138 should be broken by twisting action, the wires and cables can be constituted by ordinary wires and cables and need not be designed and arranged on exacting standards to provide allowance for twisting. This will contribute to reduction in the production cost of the connector assembly especially in view of the reduction achieved in the running cost for the production line.

Although particular embodiment of the present invention has been shown and described, it will be obvious to those skilled in the art that various changes and modifications may be made without departing from the spirit and scope of the present invention.

What is claimed is:

1. A two-shift automatic assembling apparatus for selectively assembling at least one component member to an incomplete work of a first model or at least one component member to an incomplete work of a second model during each cycle of operation of the apparatus, comprising:

a frame structure for accomodating at least a portion of one of said incomplete works of the first and second models therewithin and for permitting each of the incomplete works to be conveyed in a longitudinal direction therethrough, and a base structure supported on said frame structure and having two parallel opposite faces, said base structure being rotatable between two diametrically opposite angular positions about an axis fixed with respect to said frame structure and substantially parallel with said two faces of the base structure and with said longitudinal direction, and two sets of assembling fixtures detachably mounted on said two faces, respectively, of the base structure, each set of said assembling fixtures including work gauge means adapted to hold each of said incomplete works in a predetermined position with respect to said frame structure, carrier means adapted to carry each of said component members from the outside of said frame structure into a predetermined position within the frame structure, and parts gauge means adapted to transfer the component member from said predetermined position thereof into a predetermined ready-for-assembly position with respect to the work held in position by said work gauge means.

2. An apparatus according to claim 1, further comprising connecting means for joining each of said component members to each of said incomplete works during each cycle of operation of the assembling apparatus.

3. An apparatus according to claim 1, further comprising drive means for driving said base structure between said two angular positions thereof.

4. An apparatus according to claim 1, further comprising a rotary-type electric connector assembly which comprises first and second cables for electrical connection to said two sets of assembling fixtures and a third cable for electrical connection to external sources of current and which is operable for providing connection from said third cable to one of said first and second cables depending upon the angular position of said base structure.

5. An apparatus according to claim 4, in which said connector assembly further comprises two contact blocks each carrying contact elements, the contact elements on one of the contact blocks being connected to each of said first and second cables and the contact elements on the other contact block being connected to said third cable and being operable for connection respectively to the contact elements on the former contact block, one of the two contact blocks being rotatable with said base structure about an axis substantially aligned with the axis of rotation of said base structure and the other of the contact blocks being axially movable toward and away from the former contact block.

6. An apparatus according to claim 4, in which said connector assembly further comprises a first contact block carrying two sets of contact elements and a second contact block carrying a single set of contact elements which are equal in number to each set of contact elements on said first contact block, one set of contact elements on the first contact block being arranged within one half of the cross sectional area of the first contact block and the other set of contact elements on the first contact block being arranged within the other half of the cross sectional area of the first contact block and respectively in symmetry to said one set of contact elements with respect to an axis substantially aligned with said axis of rotation of said base structure.

7. An apparatus according to claim 6, in which said first contact block is rotatable with said base structure about an axis substantially aligned with the axis of rotation of the base structure and in which said second contact block is axially movable toward and away from said first contact block.

8. A two-shift automatic assembling apparatus as set forth in claim 1, in which said assembling apparatus further comprises stop means for preventing said base structure from turning beyond said two angular positions when the base structure is turned into one of the two angular positions.

* * * * *